United States Patent
Lottes et al.

(10) Patent No.: US 12,181,288 B2
(45) Date of Patent: Dec. 31, 2024

(54) SECURING A GEOGRAPHIC POSITION

(71) Applicant: Bayerische Motoren Werke Aktiengesellschaft, Munich (DE)

(72) Inventors: Alexander Lottes, Kirchheim b. Muenchen (DE); Pascal Minnerup, Unterschleissheim (DE); Bernd Spanfelner, Ebersberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 322 days.

(21) Appl. No.: 17/457,205

(22) Filed: Dec. 1, 2021

(65) Prior Publication Data
US 2022/0170748 A1    Jun. 2, 2022

(30) Foreign Application Priority Data
Dec. 2, 2020 (DE) ...................... 10 2020 131 996.7

(51) Int. Cl.
*G01C 21/28* (2006.01)
*G06N 7/01* (2023.01)

(52) U.S. Cl.
CPC .............. *G01C 21/28* (2013.01); *G06N 7/01* (2023.01)

(58) Field of Classification Search
CPC ................... G01C 21/28; G06N 7/01
See application file for complete search history.

(56) References Cited

U.S. PATENT DOCUMENTS

| 10,641,612 | B2 | 5/2020 | Sagall | |
| 2014/0067187 | A1* | 3/2014 | Ferguson | B60W 30/00 701/28 |
| 2016/0316325 | A1* | 10/2016 | Sadr | H04W 4/027 |
| 2018/0208197 | A1 | 7/2018 | Runge et al. | |
| 2018/0341706 | A1* | 11/2018 | Agrawal | G06V 20/48 |

(Continued)

FOREIGN PATENT DOCUMENTS

| DE | 10 2011 118 708 A1 | 5/2013 |
| DE | 10 2015 111 925 A1 | 1/2017 |

(Continued)

OTHER PUBLICATIONS

German-language Search Report issued in German Application No. 10 2020 131 996.7 dated Jul. 27, 2021 with partial English translation (11 pages).

*Primary Examiner* — Andrea C Leggett
(74) *Attorney, Agent, or Firm* — Crowell & Moring LLP (57) ABSTRACT

A method for securing a geographic position of a vehicle includes scanning multiple information sources, which each provide items of information which indicate the position of the vehicle; determining individual positions on the basis of each of items of information of one of the information sources and items of surroundings information in the region of a position hypothesis; validating items of information, the associated individual position of which deviates by not more than a predetermined amount from the position hypothesis; determining the position of the vehicle on the basis of the validated items of information, wherein a change of a quality of the items of surroundings information is determined; and, on the basis of the change, determining a probability at which the determined position deviates by more than the predetermined amount from an actual position.

12 Claims, 4 Drawing Sheets

(56) References Cited

U.S. PATENT DOCUMENTS

2019/0064830 A1  2/2019  Funayama et al.
2021/0215503 A1* 7/2021  Ries .................. G01C 21/3844
2022/0130254 A1* 4/2022  Austin .................... H04W 4/46

FOREIGN PATENT DOCUMENTS

DE  10 2018 004 229 A1  11/2019
DE  10 2019 133 316 A1   6/2021

* cited by examiner

SECURING A GEOGRAPHIC POSITION

CROSS REFERENCE TO RELATED APPLICATION

This application claims priority under 35 U.S.C. § 119 from German Patent Application No. DE 10 2020 131 996.7, filed Dec. 2, 2020, the entire disclosure of which is herein expressly incorporated by reference.

BACKGROUND AND SUMMARY OF THE INVENTION

The invention relates to determining a geographic position of a vehicle. In particular, the invention relates to securing the position determination against possible errors.

A driving assistant in a vehicle is configured to influence a longitudinal or lateral control of the vehicle. For example, a lane assistant can be configured to keep the vehicle between roadway markings which can be scanned by way of a camera and automatically recognized. A position of the vehicle has to be determined with a high level of accuracy and certainty for the control.

The determination of the position is typically subject to an array of errors and inaccuracies. Sensors provide, for example, noisy and/or corrupted items of information or can sometimes fail entirely. Different measurement conditions or complex processing heuristics result in determinations of differing accuracy or reliability. If the vehicle is controlled on the basis of an incorrect position, the safety of the vehicle or of an occupant can be endangered.

It has been proposed that scans of a single sensor which provides data for determining the position be validated individually. For this purpose, it can be determined how well the scans of the sensor match with a position hypothesis. For this purpose, an individual position can be determined on the base of the scans and it can be determined how much the individual position deviates from the position hypothesis. The individual position can be determined on the basis of items of map information, which comprise observable objects in the surroundings of the vehicle. The validation typically starts from a uniform quality of the items of map information. However, the items of map information can also age unnoticed, so that a frequency at which the determinations of a sensor are validated, although they result in the determination of an incorrect position, can be increased. The certainty of the determined position can be reduced, so that the control of the vehicle on the basis of the position can be risky.

An underlying object of the invention is to provide an improved technology for determining a secured position for a vehicle. The object is achieved by the claimed invention.

According to a first aspect of the present invention, a method for securing a geographic position of a vehicle comprises steps of scanning multiple information sources, which each provide items of information which indicate the position of the vehicle; determining individual positions on the basis of each of items of information of one of the information sources and items of surroundings information in the region of a position hypothesis; validating items of information, the associated individual position of which deviates by not more than a predetermined amount from the position hypothesis; and determining the position of the vehicle on the basis of the validated items of information; wherein a change of a quality of the items of surroundings information is determined; and on the basis of the change, a probability is determined at which the determined position deviates by more than the predetermined amount from an actual position.

It has been recognized that items of surroundings information, which can be provided in particular in the form of map data, can age unnoticed or can otherwise reflect reality less accurately. In contrast to known technologies which assume a predetermined degeneration of the quality, an actual change can be determined and taken into consideration for the determination and securing of the position. It can thus be determined at which certainty the position is determined, or at which probability the position is to be considered incorrect.

A vehicle can be controlled in dependence on the determined position. A certainty with which the control is carried out can also be dependent on further factors or conditions which can compensate for a low determination certainty. Vice versa, a high level of certainty in the position determination can compensate for a lower level of certainty at another point, for example, in the processing of control signals. An estimation of whether the vehicle can be automatically controlled in a present situation, or whether a risk of an incorrect determination to be accepted for this purpose is acceptable or not, can be possible by way of the invention in an improved manner. An improvement of the quality of the items of surroundings information can also be taken into consideration.

The probability can be determined on the basis of a product of probabilities, with each of which items of information are validated, although the determined position deviates by more than the predetermined amount from the actual position ("false positive"). The change of the quality can have an influence on the probabilities. For example, the probability of a false positive determination of an individual position in an up-to-date map can be 1 in 100,000 and in an out-of-date map can be 2 in 100,000, which corresponds to a doubling.

The probability can be determined by way of a Markov chain, which models the change of the quality of the items of surroundings information. An error tree analysis can be carried out on the basis of the Markov chain to determine the certainty of the position determination or, in consideration of further influencing factors, the control of the vehicle.

Transition probabilities between states of the Markov chain can be determined on the basis of known scans (regression test), and/on the basis of observations of a system which executes the method.

The regression test can ensure that a transition between states of the Markov chain is recognized when it occurs. A transition probability can initially be irrelevant in this case. Less dramatic deteriorations can then be recognized and intercepted by observing an executing system. A transition probability can play a role for this purpose, since, for a certain time, items of surroundings information having a lower quality than assumed are worked with. Transition probabilities can then be ascertained and possibly improved by observing the results of the observations of the system.

The transition probabilities can in particular be monitored and improved permanently to adapt the Markov chain gradually more accurately. An observation of the system can be viewed as a KPI (key performance indicator) measurement, which describes a quality of the items of surroundings information. By way of the Markov chain, it can be estimated how strongly a risk of accident of a vehicle which is controlled on the basis of a position determined as described is increased due to the quality changes. By way of the observation of the system via KPIs, which relate to the validators, a change of the quality of the surroundings information can be determined which cannot be noticed using the typical KPIs, which relate directly to map attributes.

The determination of the position by way of the method can already be robust with respect to short-term quality jumps of the items of surroundings information without consideration of the change of the quality. A trend of the quality of the items of surroundings information can be recognized by way of the proposed KPIs. By way of the Markov chain, an average risk resulting therefrom can be estimated.

The Markov chain can model or depict probabilities of changes at different speeds of the quality of the items of surroundings information. It is preferred to apply the Markov chain recursively to determine a quality change in each case for a predetermined time step. A following change of the quality can originate from a last determined quality.

A probability of a rapid deterioration of the quality can be determined on the basis of observations of the validator KPIs in the past. The observations can comprise recorded scans which were obtained, for example, in the scope of a test drive of a vehicle. Actual positions of this vehicle during the scans can be known or determined with a high level of certainty. A rapid deterioration of the quality can also be determined by way of another method. Typically, relatively few scans are sufficient to determine a rapid deterioration of the items of surroundings information, while many scans can be required to determine a slow deterioration. A deterioration of already low KPIs of a validator can be determined on the basis of relatively few scans.

A probability of a slow deterioration of the quality can be determined on the basis of a frequency at which items of information are validated, although the determined position deviates by more than the predetermined amount from the actual position. Such a frequency can be determined during the execution of a method described herein. The frequency is preferably progressively determined and applied to adapt the probability.

In a further embodiment, frequencies which were observed on various vehicles are taken into consideration. A probability can thus be determined on the basis of findings which can be collected on vehicles of an entire fleet. A large amount of test data can thus be provided within a relatively short timeframe, so that the slow change of the quality can already be determined with a high level of certainty.

A differentiation between a fast and a slow change of the quality can take place with respect to a predetermined threshold value for the change speed. The quality can be expressed in the form of an arbitrary indicator which permits a quantitative observation. In one embodiment, the quality is specified with respect to the described frequency of the false-positive determinations.

The vehicle can be controlled on the basis of the determined position and the control can be ended if a probability that items of information are validated, although the determined position deviates by more than the predetermined amount from the actual position, exceeds a predetermined threshold value. This probability is also called the false-positive or FP probability. It can be determined on the basis of an FP probability with good map data, a probability that existing map data are bad, and an FP probability in the case of poor map data.

For example, the vehicle can be controlled by a lane assistant in the transverse direction as long as the determined probability is sufficiently small. If the probability exceeds a predetermined threshold value, a driver on board can thus be requested to take over the control of the vehicle, and the lane assistant can be switched off. In addition to the probability of a false-positive determination of the position, other certainty characteristics can also be taken into consideration to determine a certainty of the overall control. If this certainty falls below a predetermined threshold value, the control can thus be ended.

According to a further aspect of the present invention, a device for securing a geographic position of a vehicle comprises multiple information sources, which are each configured to provide items of information which indicate the position of the vehicle; wherein each information source is assigned a matcher and a validator; wherein the matcher is configured to determine an individual position on the basis of the items of information of the information source and items of surroundings information in the region of a position hypothesis; and the validator is configured to validate the provided items of information if the individual position deviates by not more than a predetermined amount from the position hypothesis; and a processing unit for determining the position of the vehicle on the basis of the validated items of information. The processing unit is configured here to determine a change of a quality of the items of surroundings information; and, on the basis of the change, to determine a probability at which the determined position deviates by more than the predetermined amount from an actual position.

The processing unit can be configured to entirely or partially execute a method described herein. For this purpose, the processing unit can comprise a programmable microcomputer or microcontroller and the method can be provided in the form of a computer program product having program code stored thereon. The computer program product can also be stored on a computer-readable data carrier. Features or advantages of the method can be transferred to the device or vice versa.

According again to a further aspect of the present invention, a vehicle comprises a device described herein. The vehicle can in particular comprise a motor vehicle, for example, a passenger vehicle or a motorcycle. A truck or a bus can also be used.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
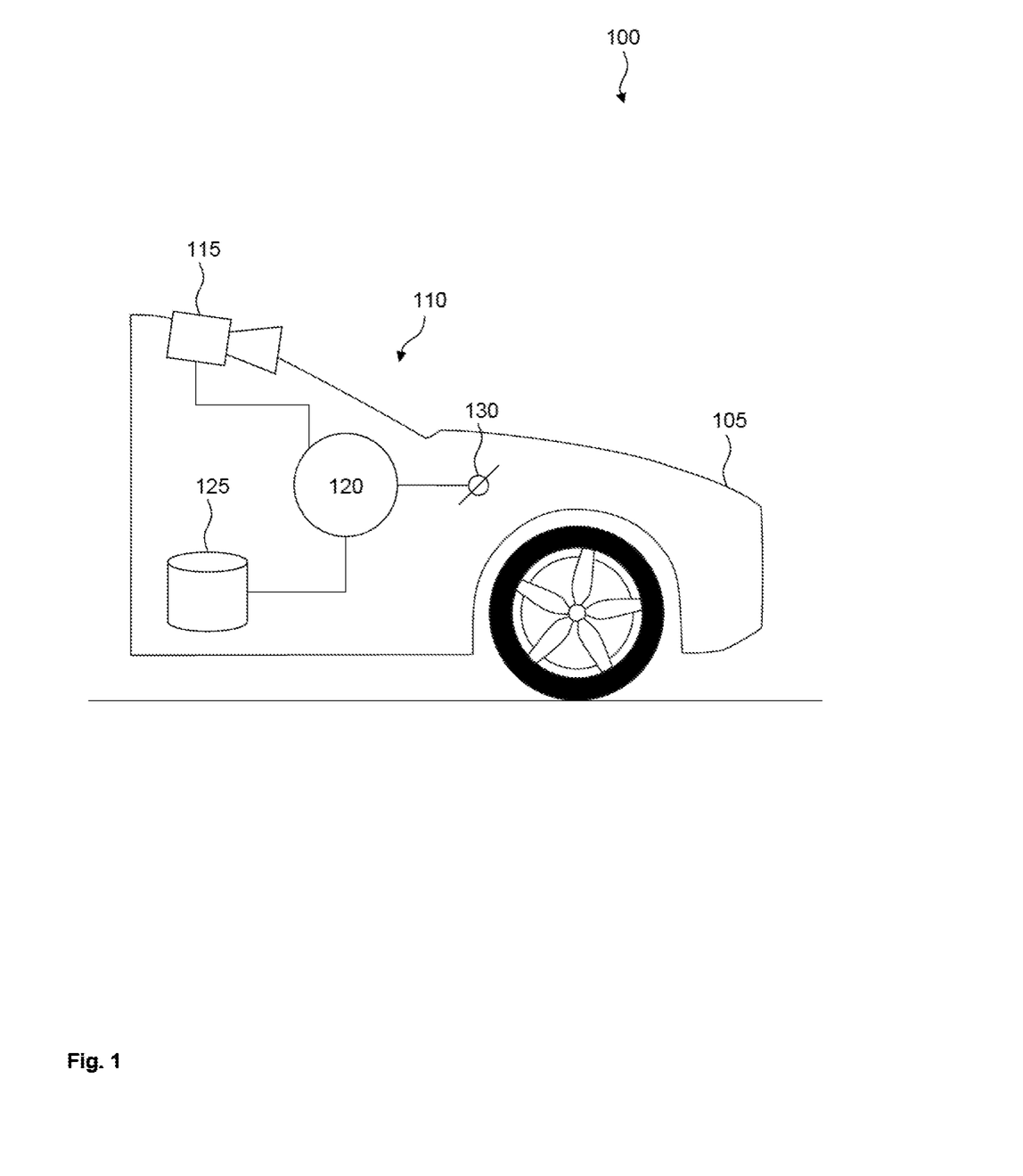
FIG. 1 illustrates a system.

FIG. 1 shows a system 100, which comprises a vehicle 105, in particular a motor vehicle such as a passenger vehicle or motorcycle, and a device 110, which is attached on board the vehicle 105. The vehicle 105 can be controlled in dependence on a determined geographic position, for example in the longitudinal and/or transverse direction. The device 110 comprises at least one information source 115 for providing items of information which indicate a position and/or alignment of the vehicle 105. As explained in more detail later, preferably multiple information sources 115 are provided. An information source 115 can comprise a sensor, which can be configured in particular to scan surroundings of the vehicle 105. Multiple information sources 115 can also use a shared sensor. The sensor can in particular comprise a camera, a radar sensor, a LiDAR sensor, or an ultrasonic sensor. A receiver for signals of a preferred satellite-based navigation system can also be used as a sensor. Known such systems comprise GALILEO, GPS and GLONASS. Determinations can in each case be improved on the basis of differential measurements (DGPS: differential GPS).

It is furthermore preferred that each information source 115 uses only one sensor to ensure statistical independence of the provided items of information. A processing unit 120 is provided for processing items of information which are provided by the information source 115. Furthermore, a reference 125 can be provided which provides items of information which can be associated with multiple or all information sources 115. For example, the reference 125 can comprise a map memory for providing map data or an odometer for providing odometry data. The processing unit 120 can be connected to an interface 130, which is preferably configured to provide a determined position and/or alignment.

It is proposed that the processing unit 120 is configured to determine an individual position of the vehicle 105 on the basis of each of items of information which are provided by various information sources 115. It can use items of information of the reference 125 for this purpose. For example, the information source can comprise a camera which acquires landmarks in the surroundings of the vehicle 105. Positions of the landmarks can be comprised by items of geographic surroundings information of the reference 125, so that the individual position can be determined in that the observations are matched to the known items of information. This process is also called "matching" and an executing element is also called a "matcher". A matcher is typically provided specifically for a predetermined information source 115. Different, specialized matchers can be provided for different driving situations.

The processing unit 120 can also provide a position hypothesis, on the basis of which, for example, it is possible to work during a following determination. The position hypothesis can be determined, for example, on the basis of a previously determined position and a movement of the vehicle 105 which has taken place since then. Alternatively, the determined position can be used as the position hypothesis. In the matching, items of surroundings information of the reference 125 in a predetermined region around the position hypothesis can be taken into consideration.

The processing unit 120 can determine a position of the vehicle 105 on the basis of the individual positions. Moreover, the processing unit 120 is preferably configured to determine for each of the individual information sources 115 how well the provided items of information match with the determined position or the position hypothesis. For this purpose, the respective items of information and the individual position determined therefrom can be observed. The process is also called validation and an executing component is called a validator. A matcher and a validator can be embodied integrated with one another.

If the items of information match less well than a predetermined amount with the determined position, the processing unit 120 can thus provide a signal which can be provided via the interface 130. The signal can be output if the items of information of at least one of multiple information sources 115 match worse than predetermined with the determined position. The signal can indicate that a position could not be determined or the position could not be determined with sufficient certainty. A control dependent on the determined position, for example, for a movement of the vehicle 105, can thereupon be deactivated and a driver can be requested to take over the control of the vehicle 105.

Figure 2:
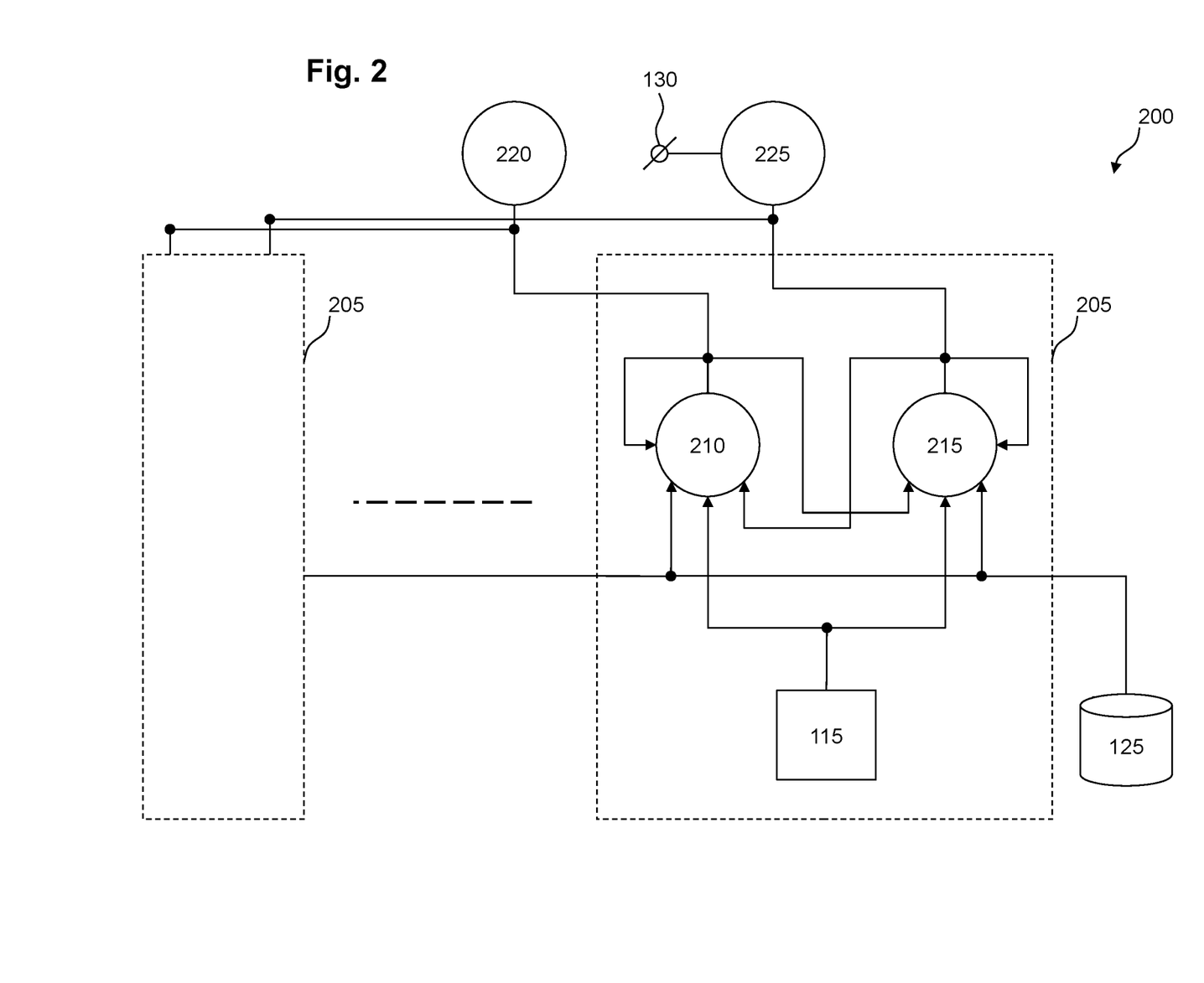
FIG. 2 illustrates a flow chart of a method.

FIG. 2 shows a flow chart of a method 200, which can be executed in particular on board a vehicle 105 and preferably by way of a device 110. The method 200 comprises multiple function blocks 205, which can be executed concurrently with one another. For this purpose, the same elements or elements different from one another of the device 110 can be used. Although an arbitrarily number of function blocks 205 can be formed, in a typical vehicle 105, their number is generally approximately 2-4.

In a function block 205, an information source 115 provides items of information which indicate a position, an alignment, or a pose of the vehicle 105. A pose generally comprises a position and an alignment. In three-dimensional space, a pose can comprise, for example, six specifications, of which three are translational and three are rotational with respect to a Cartesian coordinate system. Although exemplary embodiments of the invention could also be executed on the basis of a position or an alignment instead of a pose, poses are discussed hereinafter.

In a step 210, an individual pose is determined on the basis of the items of information provided by the information source 115. In the present case, an "individual" pose is referred to when it is determined on the basis of only one information source 115. The pose of the vehicle 105 is determined on the basis of multiple "individual" poses. Step 210 can be carried out in an arbitrary way and can comprise, for example, averaging, an adaptive filter, a physical model of the vehicle 105, or a trained neural network. The determination can take place on the basis of still further items of information which are provided by the reference 125. Step 210 can also be fed back and can process an individual pose which it has previously provided itself.

A fundamental check can take place with respect to a determined pose. For example, it can be determined whether the vehicle 105 is located on a roadway on which a driving function to be controlled is offered at all. For example, a condition for following a lane can be that the roadway comprises a freeway or an expressway. Such a check can also be carried out by way of a separate function block. If a required condition is not met, the method 200 can thus terminate.

In a step 215, the items of information of the information source 115 used in step 210 are assessed in that it is checked how well they match with a pose of the vehicle 105. This determination can also be called validation and an element executing step 215 can be referred to as a validator. The pose of the vehicle 105 is determined on the basis of determined individual poses, as explained in more detail below. For the assessment, it can be determined how well scans of the information source 115 match with items of surroundings information of the reference 125. In a further embodiment, a distance can also be determined which lies between the individual position and the actual position of the vehicle 105. For respective contained positions, the distance can comprise a Euclidean distance and for respective contained alignments, it can comprise an angle lying between them. The distance and the angle can be used to form a combined characteristic to facilitate a later comparison to a predetermined amount. The predetermined amount can correspond to a maximum tolerable error in the determined pose or can be less. An individual amount can be predetermined for each function block 105. If the distance or the characteristic exceeds the predetermined amount, a signal, in particular a warning signal, can thus be provided at a step 225.

The predetermined amount can be determined in dependence on a driving state and/or a driving function of the vehicle 105. The driving function can in particular comprise a driving assistant which is configured to relieve or assist a driver of the vehicle 105. The driving assistant can carry out a longitudinal control and/or a transverse control of the vehicle 105 or intervene in one of them if needed. In one embodiment, the driving assistant is configured for the automatic or autonomous guiding of the vehicle 105.

If the individual pose should match worse than predetermined with the determined pose of the vehicle 105, for example, in that the distance exceeds the predetermined amount, a signal can thus be provided which can be evaluated in a step 220. Moreover, the determination of the pose in step 210 can take place in dependence on the determined quality, the determined distance, or the determined signal. For example, an adaptive filter can be calculated in step 210, which can be reinitialized if the individual pose provided by the filter deviates more than predetermined from the pose of the vehicle 105.

In a step 220, the pose of the vehicle 105 is determined. For this purpose, the individual poses determined in the function blocks 105, in particular steps 210, are preferably combined with one another. The combination can take into consideration all determined individual poses in the same manner or individually. For example, individual poses can be taken into consideration which are determined on the basis of different processing of items of information of the same sensor. Individual poses or data underlying them which were determined as non-trustworthy by one of steps 215 can be discarded in the determination of the pose of the vehicle 105. The determined pose of the vehicle 105 can also be provided to the outside.

In a step 225, validation signals of the function blocks 205 can be evaluated. A signal which indicates a possibly non-trustworthy determined pose of the vehicle 105 can be determined and provided at the interface 130 on the basis of one or multiple signals from steps 215 of the function blocks 105.

In one embodiment, such a signal is already output at the interface 130 if at least one of the determined individual poses deviates by more than the assigned predetermined amount from the determined pose. This can be equivalent to the presence of at least one warning signal in one of steps 215.

In another embodiment, in a step 215, a warning signal can not only be provided or can be not provided, but rather no statement can also be made about a determined pose. For example, a LiDAR sensor in the surroundings of the vehicle can scan a further vehicle which does not correlate with any object noted in a map memory. In this case, an individual pose determined on the basis of other scans of the LiDAR sensor can neither be confirmed nor doubted. A judgment of the determined individual pose in step 215 can be absent in such a case. As a result, in step 225, the warning signal at the interface 130 cannot be determined on the basis of the absent signal. However, the warning signal can still be given if another validator 215 determines doubt in the trustworthiness of an assigned individual pose or too few validators 215 judge the pose. If a statement on the trustworthiness of the observed data is not to be made in any of steps 215 of the function blocks 205, the warning signal can also be output in step 225.

To observe the certainty of a position determination, it can be determined how frequently or at which probability a position of the vehicle is determined which deviates by more than a predetermined amount from the actual position without an incorrect determination being recognized. In the following table, a safety cushion is indicated for different error rates and different quantities of scans with a predetermined determination certainty. The scans are carried out during the travel of measurement vehicles so that they are indicated in the unit of kilometers traveled in this case.

| Error rate | 10,000 km | 50,000 km | 200,000 km | 500,000 km | 2,500,000 km |
| --- | --- | --- | --- | --- | --- |
| 1E-05 | 71.00 | 32.30 | 16.65 | 10.90 | 5.43 |
| 1E-03 | 8.00 | 4.13 | 2.57 | 1.99 | 1.44 |
| 1E-02 | 3.21 | 1.99 | 1.49 | 1.31 | 1.14 |
| 1E-01 | 1.70 | 1.31 | 1.16 | 1.10 | 1.04 |
| 1 | 1.22 | 1.10 | 1.05 | 1.03 | 1.01 |

For example, if an error rate of 1 E-05 was determined on the basis of scans on only 10,000 km, statistically, 71 unrecognized incorrect determinations (false positives) occur for 1 recognized incorrect determination of the position (true negative). If the error rate is determined on the basis of 2.5 million km, only 5.43 times as many unrecognized as recognized incorrect determinations are thus to be expected. Overall, it may be seen that the more test kilometers have to be covered, the lower the error rate is. Alternatively, an increased certainty has to be added to the error rate.

The probability of a false positive determination of a single scan can be reduced in that a special matcher is used for an existing situation. Available scans then have to be allocated onto more different matchers, however, so that fewer scans are available for an individual matcher. The situation in which the specialized matcher is applied occurs comparatively rarely, so that an increased safety margin exists and the overall system performs worse.

Figure 3:
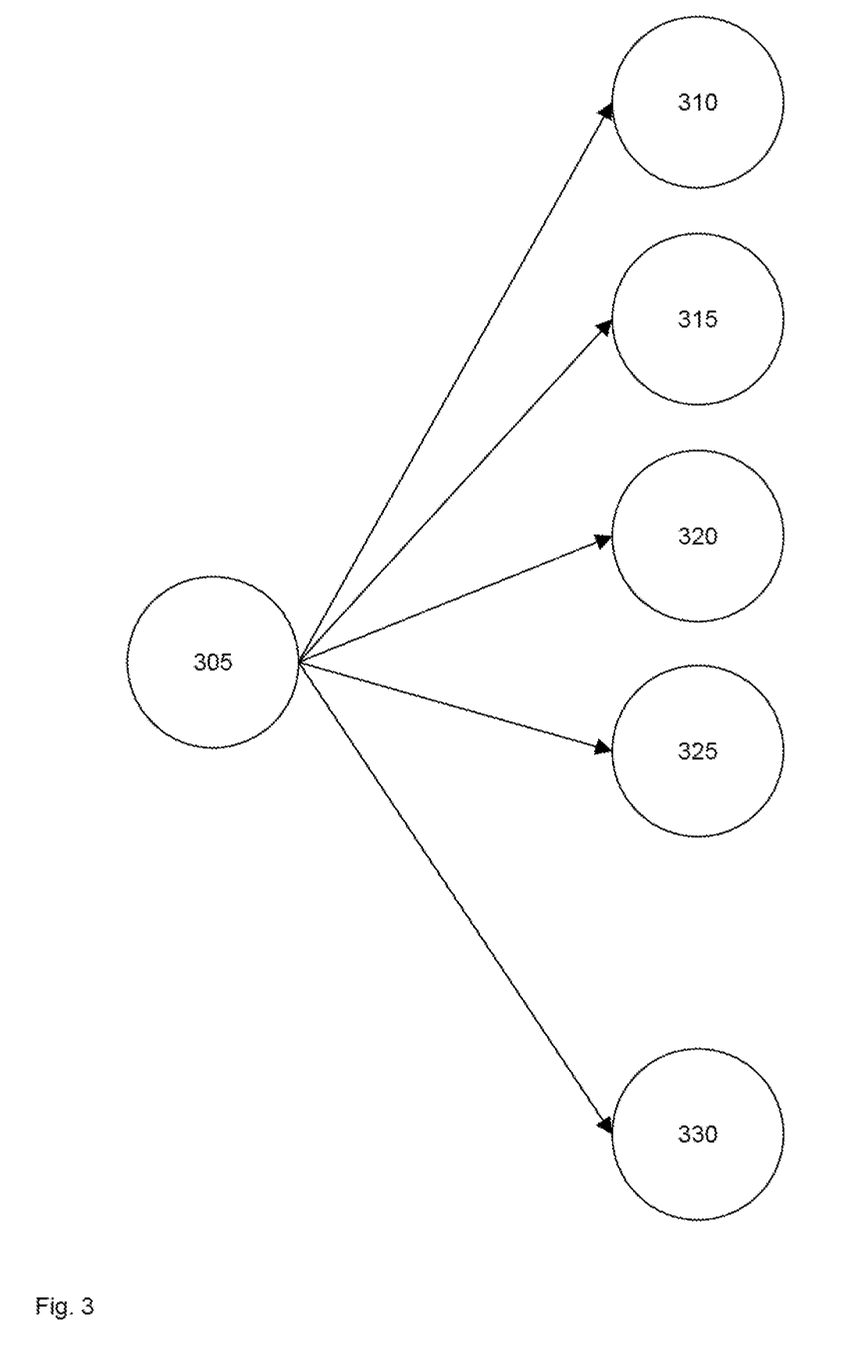
FIG. 3 illustrates an exemplary Markov chain.

FIG. 3 shows an exemplary Markov chain 300 for tracking the change of a quality of items of surroundings information of the reference 125. The quality is reflected by a performance of a system 100 with respect to false-positive determinations of the geographic position of the vehicle 105.

The Markov chain 300 comprises a current state 305, in which the quality has a predetermined value. From this state, transitions into various other states are possible, which each indicate a specific quality. A state 305 indicates an increased quality, a state 310 indicates a uniform quality, a state 315 indicates a slightly reduced quality, a state 320 indicates a significantly reduced quality, and a state 325 indicates a dramatically reduced quality. Other and in particular further states can be formed accordingly. Quantitative threshold values for distinguishing the respective quality changes can be defined as needed.

Each transition between states 305 to 325 is assigned a probability which can be calculated on the basis of tests or running determinations. The Markov chain 300 is preferably applied to a predetermined time step of, for example, a day or a week. A following state 310 to 325 then assumed can be used as the current state 305 for a following pass.

Figure 4:
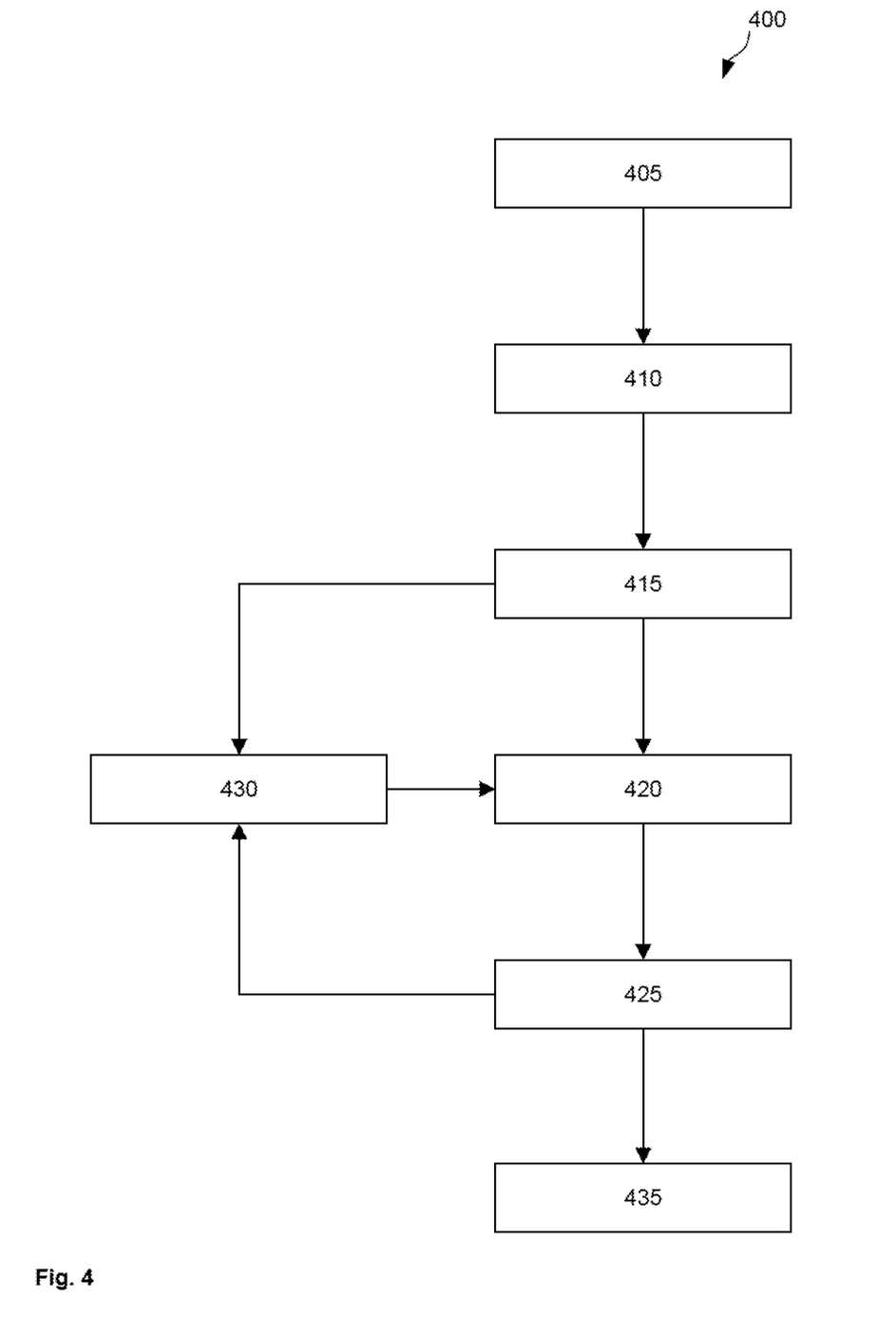
FIG. 4 illustrates a flow chart of a further method.

FIG. 4 shows a flow chart of a method 400 for determining a secured position for a vehicle 105. The method 400 makes use in particular of technologies which are described above with reference to FIGS. 1 to 3.

In a step 405, surroundings of the vehicle 105 are scanned. In a step 410, a position hypothesis can be determined which at least approximately indicates where the vehicle 105 is located. Subsequently, in a step 415, items of surroundings information in a predetermined region around the position hypothesis can be determined.

In a step 420, individual positions can each be determined on the basis of a scan and the determined items of surroundings information. If a position deviates by more than a predetermined amount from the position hypothesis, the assigned scan can thus be negatively validated, otherwise positively. In a step 425, the position of the vehicle 105 can be determined on the basis of positively validated scans.

In a step 430, a change of the quality of the items of surroundings information can be determined. Changes at different speeds can be prognosticated on the basis of different approaches and their probabilities can be predicted. If the quality of the items of surroundings information decreases, a probability at which an individual position is determined unnoticed in step 420, which is farther away than the predetermined amount from an actual position of the vehicle 105, can increase.

In a step 435, a certainty of the determined position can be determined on the basis of a product of probabilities at which the individual positions were determined. If the quality of the items of surroundings information changes, the individual probabilities typically also change and accordingly the certainty determined in this step. The determined certainty can be put into context with other parameters which relate to a control of the vehicle 105. If it is determined here that the control cannot be carried out with a predetermined certainty in a predetermined quality, the control can thus be switched off.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

- 100 system
- 105 vehicle
- 110 device
- 115 information source
- 120 processing unit
- 125 reference
- 130 interface
- 200 method
- 205 function block
- 210 determine pose
- 215 evaluate, validate signal
- 220 determine pose
- 225 provide signal
- 300 Markov chain
- 305 determined quality
- 310 quality increased
- 315 quality uniform
- 320 slight reduction of the quality
- 325 significant reduction of the quality
- 330 dramatic reduction of the quality
- 400 method
- 405 scan surroundings
- 410 determine position hypothesis
- 415 determine items of surroundings information
- 420 validate scans
- 425 determine position
- 430 determine change in quality
- 435 certainty sufficiently high?

What is claimed is:

1. A method for securing a geographic position of a vehicle, the method comprising:
   scanning multiple information sources, wherein each of the information sources provides items of information which indicate the position of the vehicle;
   determining individual positions based on each of items of information of one of the information sources and items of surroundings information, including map data, in the region of a position hypothesis;
   validating items of information, an associated individual position of which deviates by not more than a predetermined amount from the position hypothesis;
   determining the position of the vehicle based on the validated items of information;
   determining a change of a quality of the items of surroundings information; and
   on the basis of the change, determining a probability at which the determined position deviates by more than the predetermined amount from an actual position;
   wherein the probability is determined by way of a Markov chain, which models the change of the quality of the items of surroundings information; and
   wherein a probability of a rapid deterioration of the quality is determined based on observations of past validator KPIs.

2. The method according to claim 1, wherein the probability is determined based on a product of probabilities with each of which items of information are validated, although the determined position deviates by more than the predetermined amount from the actual position.

3. The method according to claim 1, wherein the Markov chain models probabilities of changes at different speeds of the quality of the items of surroundings information.

4. The method according to claim 1, wherein a probability of a slow deterioration of the quality is determined based on a frequency at which items of information are validated, although the determined position deviates by more than the predetermined amount from the actual position.

5. The method according to claim 4, wherein frequencies which were observed on various vehicles are taken into consideration.

6. The method according to claim 1, wherein the vehicle is controlled based on the determined position and the control is ended if a probability that items of information are validated, although the determined position deviates by more than the predetermined amount from the actual position, exceeds a predetermined threshold value.

7. The method according to claim 1, wherein the quality indicates a frequency of false-positive determinations of the geographic position of the vehicle.

8. The method according to claim 1, wherein the items of information indicate a pose of the vehicle, the pose including the position and an alignment of the vehicle.

9. A device for securing a geographic position of a vehicle, the device comprising:
   multiple information sources, wherein each of the information source is configured to provide items of information which indicate the position of the vehicle, wherein:
   each of the information sources is assigned a matcher and a validator;
   the matcher is configured to determine an individual position based on the items of information of the information source and items of surroundings information, including map data, in the region of a position hypothesis; and the validator is configured to validate the provided items of information if the individual position deviates by not more than a predetermined amount from the position hypothesis;

a processing unit for determining the position of the vehicle based on the validated items of information, wherein the processing unit is configured to:

determine a change of a quality of the items of surroundings information; and based on the change, determine a probability at which the determined position deviates by more than the predetermined amount from an actual position;

wherein the probability is determined by way of a Markov chain, which models the change of the quality of the items of surroundings information; and wherein a probability of a rapid deterioration of the quality is determined based on observations of past validator KPIs.

10. A vehicle comprising the device according to claim 9.

11. The device according to claim 9, wherein the quality indicates a frequency of false-positive determinations of the geographic position of the vehicle.

12. The device according to claim 9, wherein the items of information indicate a pose of the vehicle, the pose including the position and an alignment of the vehicle.

* * * * *